US006150021A

United States Patent [19]
Blatter et al.

[11] Patent Number: 6,150,021
[45] Date of Patent: Nov. 21, 2000

[54] BALL-SHAPED POLYESTER PARTICLES CAPABLE OF CROSSLINKING AT LOW TEMPERATURE, PRODUCTION THEREOF AND USE OF SAME FOR POWDER LACQUERS

[75] Inventors: Karsten Blatter, Erftstadt; Peter Simon, Eppstein, both of Germany

[73] Assignee: Aventis Research & Technologies GmbH & Co. KG, Frankfurt, Germany

[21] Appl. No.: 09/367,469

[22] PCT Filed: Feb. 11, 1998

[86] PCT No.: PCT/EP98/00747

§ 371 Date: Aug. 13, 1999

§ 102(e) Date: Aug. 13, 1999

[87] PCT Pub. No.: WO98/36010

PCT Pub. Date: Aug. 20, 1998

[30] Foreign Application Priority Data

Feb. 17, 1997 [DE] Germany ................... 197 05 961

[51] Int. Cl.$^7$ ................. B32B 15/02; C08F 6/00
[52] U.S. Cl. .............. 428/402; 528/272; 528/302; 528/307; 528/308; 528/308.6; 528/481; 528/488; 528/490; 528/491; 528/503; 525/437
[58] Field of Search ................ 528/272, 302, 528/307, 308, 308.6, 481, 488, 490, 491, 503; 428/402; 525/437

[56] References Cited

U.S. PATENT DOCUMENTS 4,687,811 8/1987 Sasaki et al. ................. 525/100
5,736,621 4/1998 Simon et al. ................. 528/271

FOREIGN PATENT DOCUMENTS 0 751 166 A2 1/1997 European Pat. Off. .

*Primary Examiner*—Samuel A. Acquah
*Attorney, Agent, or Firm*—Frommer Lawrence & Haug LLP

[57] ABSTRACT

The invention relates to spherical transparent polyester particles having a mean particle size <50 μm and a monomodal particle size distribution having a span (d90–d10/d50)<2.5 which can be melted to form a continuous coating at temperatures <200° C., to a process for their preparation and to their use for powder coatings.

In a preferred embodiment the particles comprise units of formulae (I) and (2)

—CO—X—CO—  (1)

—O—D—O—  (2)

where

X is a substituted or unsubstituted $C_6$ to $C_{14}$-aromatic radical or an alkylene, polymethylene, cycloalkane or dimethylenecycloalkane group or a straight-chain or branched, saturated or unsaturated alkanediyl group and D is an alkylene, polymethylene, cycloalkane or dimethylenecycloalkane group or a straight-chain or branched, saturated or unsaturated alkanediyl group.

17 Claims, 1 Drawing Sheet

15μm

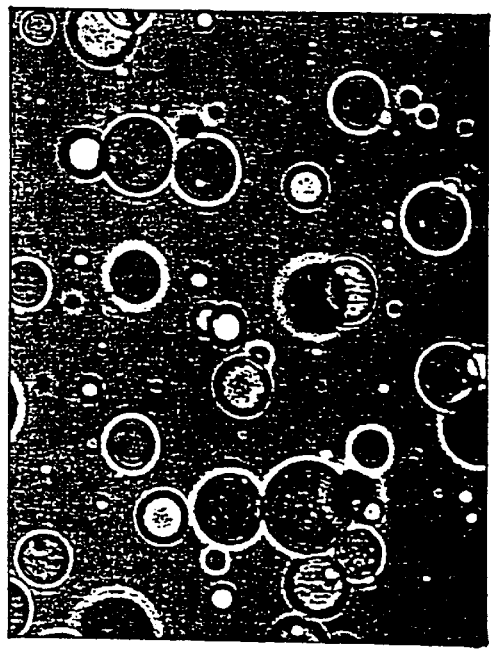
Fig. 1A
15μm
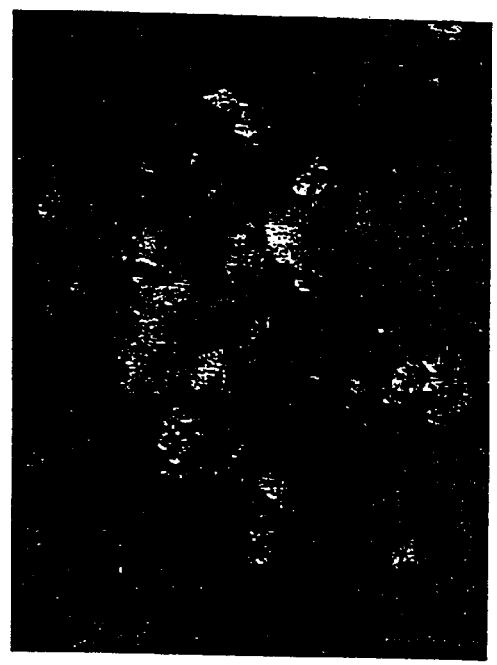
Fig. 1B
75μm
Fig. 1C
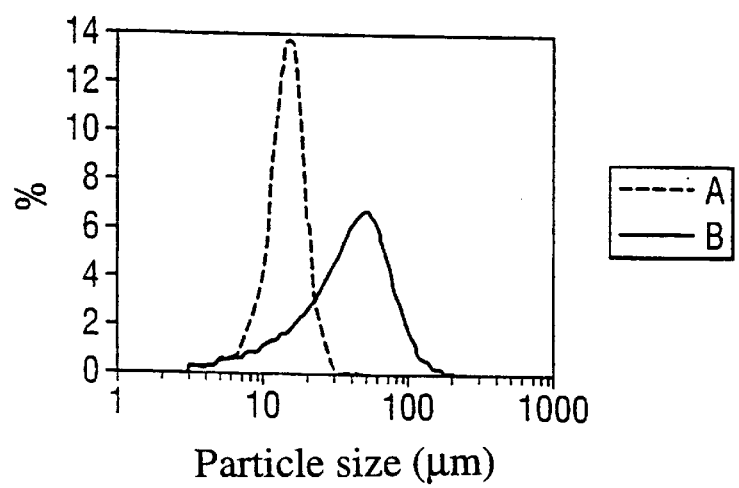

BALL-SHAPED POLYESTER PARTICLES CAPABLE OF CROSSLINKING AT LOW TEMPERATURE, PRODUCTION THEREOF AND USE OF SAME FOR POWDER LACQUERS

The present invention relates to spherical polyester particles having particle sizes <50 μm, which can be crosslinked if desired at temperatures <200° C., to a process for their preparation and to their use as powder coatings.

Transparent powder coatings consist in general of a film-forming polymer which may be crosslinkable, and of additives such as, for example, flow improvers or devolatilizing auxiliaries.

Powder coatings are traditionally prepared by subjecting the abovementioned components to intense mixing in an extruder at a temperature above the softening point of the film-forming polymer but below the crosslinking temperature and then, by means of a milling process, bringing the resulting extrudate to a mean particle size of from about 40 to 70 μm. The milling process leads to powders of irregular structure, which means that powders having a mean particle size of markedly less than 30 μm can no longer be processed by the electrostatic spray techniques customary in the processing of powder coatings. For example, EP-A-0 459 048 mentions that powder coating compositions having a particle size of less than 15 μm cannot be processed by the electrostatic spray method.

The milled powders used in the prior art have a mean particle diameter of from about 40 to 70 μm and lead typically to a coating thickness of from 40 to 70 μm. The milling technology produces, in particular, a very broad particle size distribution. In addition, a broadening of this distribution is observed with increasing fineness of the powders.

The breadth of a particle size distribution is characterized using not only the parameter d50, for which just 50% of the particles are greater than or smaller than the value d50, but also two further parameters: d10 designates the particle size for which 10% of the particles are smaller than this value. Correspondingly, d90 designates the particle size for which 90% of the particles are finer than the value d90. To characterize the breadth of a particle size distribution it is usual to form a quotient which is referred to as the span and is calculated in accordance with the following formula: span=d90–d10/d50. The relationship is thus: the smaller the span the narrower the particle size distribution. A powder comprising spheres identical in size would have a span of 0. For milled powders with a mean particle size d50 of 50 μm, a span of 3–4 is typically obtained.

On the basis of economic considerations (lower material consumption) but also of technical advantages (greater flexibility of the coating) a relatively low coat thickness is desirable for powder coatings.

There has therefore been no lack of attempts in the past to obtain a reduction in the particle size by means of new technologies without incurring the abovementioned disadvantages in processability. The aim is, in general, to prepare particles with a near-ideal spherical form, since such powders exhibit substantially more favorable flow behavior than the irregular milled powders. It has been attempted, for example, to prepare near-spherical particles by spraying polymer melts. The results presented in WO 92/00342 indicate, however, that this leads only to moderate success. The particles obtained by this technique, although having a smoother surface than milled powders, are still far removed from the ideal structure of a sphere.

Another method which has been investigated for the preparation of spherical particles is the spraying of polymers from a supercritical solution, as described, for example, in EP-A-0 661 091 or EP-A-0 792 999. This method too has substantial disadvantages. For example, in the cited applications it is stated that, owing to the sudden evaporation of the supercritical "solvent", a powder is obtained which has a porous structure. When these powders are employed to prepared films there is—in comparison with nonporous powders—an increased occurrence of bubble formation and thus of defects in the coating, since the porous structure means that a large amount of gas is trapped in the powder and must be removed in the course of the process of film formation. The use of supercritical solvents, moreover, is technically complex since, for example, it requires operation under high pressures.

A method of producing spherical particles which differs in its principle is to produce a dispersion. Physical laws dictate that, in a dispersion, the perfect helical form is the preferred geometry of the particles obtained. There has therefore been no lack of attempts in the past to obtain polymer particles which can be used as binders in coating systems, preferably in high-solids liquid coating systems, by preparing them in dispersion (Keith Barett, Dispersion Polymerization in Organic Media, John Wiley & Sons, London, 1975). GB-1 373 531, for example, describes the preparation of stable dispersions of polycondensation polymers, such as polyesters.

The possibility of using the polymer particles from nonaqueous dispersion processes, based in particular on polyesters, as a powder coating is addressed in DE-C-21 52 515. Here, an existing polymer is brought into dispersion at a temperature <200° C. and, by adding pigments, in some cases at room temperature, a coloration is achieved. However, the resulting particles are described as substantially spherical "aggregates" of primary polymer particles, and pigment particles. The isolation of material by spray drying leads apparently to relatively large structures which it was necessary to convert back into a fine powder by means of mechanical comminution. Following the comminution of the initially formed agglomerates, the stated particle size range is from about 2 to 50 μm, although there is no information whatsoever about the mean particle size or the particle size distribution. Furthermore, no methods are indicated of how to prepare powder coating systems which crosslink at the desired low temperatures of between 120 and 200° C. In the case of the crosslinking systems mentioned, the only systems employed are those whose crosslinking temperature is above the temperature required for dispersing.

The use, as described in DE-C-21 52 515, of a polymer which has already been condensed to high molecular weights as a starting product for dispersion preparation, moreover, has the following disadvantages: the already considerable viscosity of the polymers makes it difficult to achieve good division of the melt and to obtain a homogeneous particle size distribution. In general it is necessary to use very high temperatures in order sufficiently to reduce the viscosity of the polymer. Customary commercial polyesters used as powder coatings have a viscosity at 200° C. in the range from 3000 to 20,000 mpas.

The object of the present invention, consequently, is to provide spherical polyester particles, having a very low particle size and a narrow particle size distribution, which can be processed even at low temperatures to give a continuous coating and, if desired, can be crosslinked at these temperatures and are therefore suitable for use in powder coatings.

The present invention achieves this object and provides spherical, transparent, nonporous particles which can be crosslinked as desired and have a mean particle size of <50 μm and a monomodal particle size distribution with a span (d90–d10/d50) of less than 2.5, which can be melted at temperatures <200° C. to form a continuous coating, and a process for their preparation, and for their use for powder coatings.

The novel, spherical transparent polyester particles which can be crosslinked if desired are prepared by a. dispersing the starting materials for a polyester binder in an inert high-boiling heat transfer medium at a temperature which is at least as high as the softening temperature of the starting materials, in the presence of at least one polymeric, preferably organic, dispersion stabilizer, and
b. then heating the reaction mixture to a temperature in the range from 120 to 280° C., with simultaneous removal of the condensation byproducts, until the polyester has the desired molecular weight;
c. thereafter cooling the reaction mixture, in the case of a crosslinkable functional polyester, to a temperature in the range from 60 to 140° C. and adding at least one polyfunctional crosslinking agent or epoxy resin, and
d. subsequently reducing the temperature to within a range which is below the softening temperature of the polyester and separating off the resulting spherical polyester particles.

The starting materials employed are preferably oligoesters having a viscosity of less than 1000 mPas (measured at 200° C.), in particular <500 mPas, which comprise units of the formulae (1) and (2),

—CO—X—CO—      (1)

—O—D—O—      (2)

where
X is a substituted or unsubstituted $C_6$ to $C_{14}$-aromatic radical or an alkylene, polymethylene, cycloalkane or dimethylenecycloalkane group or a straight-chain or branched, saturated or unsaturated alkanediyl group and
D is an alkylene, polymethylene, cycloalkane or dimethylenecycloalkane group or a straight-chain or branched, saturated or unsaturated alkanediyl group.

To save time it is preferred first of all to prepare oligoesters of the above-described composition in the melt by heating the carboxylic acid components, such as terephthalic, isophthalic, adipic or fumaric acid, to name but a few, in the form of the acid or as low molecular mass alkyl esters, together with the diol components, for example ethylene glycol, diethylene glycol, neopentylglycol or bis-hydroxymethylcyclohexane, in the melt in the presence of a transesterification catalyst, such as manganese acetate or zinc salts or tin salts, until the majority of the condensation products water or the lower alkanols, respectively, has been distilled off. In the course of this operation, however, no significant increase is observed in the viscosity of the melt. At 200° C. the viscosity is still <1000 mPas.

An oligomer mixture of this kind can be converted, for example, to a novel dispersion directly at elevated temperature by combination with heat transfer oil and dispersant. This method is preferred for large-scale industrial preparations. Alternatively, however, it is possible to cool the oligomer mixture for the purpose of storage and to heat it up again later. In general, it is also possible to carry out the preparation of the oligomers in the actual dispersion.

In a practical embodiment of the novel process the starting materials, preferably as an oligomer mixture, are mixed in step (a) in an inert, high-boiling heat transfer medium, the mixture is heated to an elevated temperature which must lie above the softening temperature of the starting materials, judiciously in the range from 150 to 280° C., and then at least one dispersion stabilizer or a dispersion stabilizer mixture is incorporated by stirring.

Heat transfer media (dispersion media) which have proven particularly appropriate are aliphatic heat transfer oils having a boiling point in the range from 150 to 300° C. Such heat transfer oils are—in the technical sense—free from aromatic structural groups; in other words, they contain not more than 2% by weight, preferably not more than 1% by weight, of aromatic constituents.

Owing to the low polarity of these oils, which are marketed, for example, by Exxon Chemical under the trade names ®Isopar, ®Exxsol or ®Norpar, the polyesters are not swollen. This is a problem which occurs in some cases with aromatic oils, which in principle are equally suitable for the dispersion process.

General rules for the design of appropriate polymeric dispersion stabilizers are given by Keith Barett in "Dispersion Polymerization in Organic Media", John Wiley & Sons, London, 1975 on pages 45 to 110. Principal requirements are solubility of the polymeric dispersion stabilizer in the dispersion medium used, and polar or reactive groups which allow strong interaction with the particles that are to be dispersed.

For the novel process it is preferred to employ amphiphilic copolymers or surface-modified inorganic compounds. Examples of the latter are phyllosilicates surface-modified with trialkylammonium salts, especially bentonite surface-modified with trialkylammonium salts, or amphiphilic copolymers comprising a polar polymer unit, for example poly-N-vinyl-pyrrolidone, and an apolar polymer unit, for example long-chain α-olefins such as 1-eicosene.

Such amphiphilic copolymers are marketed by the company ISP Global under the trade name ®Antaron and have been found particularly appropriate. As described, for example, in EP-B-0 392 285, Antaron has already been employed successfully at relatively low temperatures for stabilizing polyurethane dispersions. It has been found that Antaron can also be employed with advantage, however, at temperatures up to 300° C. and results in excellent stability of the dispersions.

The content of the dispersion stabilizer is, in accordance with the invention, in the range from 0.1 to 6% by weight based on the polyester starting materials, preferably in the range from 0.3 to 4% by weight and, in particular, in the range from 0.5 to 2% by weight in order to obtain particles having the desired size.

In a subsequent step (b) the reaction mixture is heated further to a temperature in the range from 120 to 280° C., in particular from 200 to 250° C., with the resulting condensation byproducts being removed in parallel. The temperature is maintained until the polyester has reached the desired molecular weight, which is usually within the range of Mn=500 to 20,000, preferably in the range from 1000 to 10,000. The molecular weight is determined by the duration of the reaction, which can be monitored by taking samples.

In order to increase the functionality of the polyester it is possible, for crosslinkable systems after the required molecular weight has been reached, to add polyfunctional compounds subsequent to step (b). For example, polyfunctional carboxylic acids or alcohols, for example trimellitic anhydride, are added at the same reaction temperature, and heating is continued for a while in order to ensure that the components added are incorporated.

Following the conclusion of the condensation in step (b) it is also possible, in order to optimize the coating properties of the polyester—as is desirable for optimum surface quality of the powder coat finishes—to add additives such as flow assistants or devolatilization assistants, for example. This is done by cooling the mixture to 160–200° C. and adding the desired additives at the same time as stirring the reaction mixture.

The reaction mixture is subsequently cooled to a temperature in the range from 60 to 140° C., in particular from 80 to 120° C., and, in the case of a crosslinkable functional polyester, at least one polyfunctional crosslinking agent or an epoxy resin is added. By this method it is possible to avoid the crosslinking reaction to the extent that the coatings obtained from the powders have the customary gel times of from 2 to 5 minutes at the baking temperature (e.g. 180° C.). The novel powder coatings therefore are no different in terms of baking temperatures or gel times from conventional systems obtained by extrusion and milling.

The novel polyesters can both exhibit thermoplastic behavior and contain functional groups which are subsequently crosslinkable.

The carboxyl groups of functional polyesters can be crosslinked, for example, with epoxides. Examples of customary compositions of such polyesters are given in the following monograph: David A. Bate, "The science of powder coatings" Volume 1, SITA Technology, ISBN 0 947798005, to which explicit reference is hereby made. Examples of typical raw materials which can be used for functional polyesters are the following dicarboxylic acids, or their low molecular mass esters: terephthalic, isophthalic, adipic, sebacic, phthalic and fumaric acid. Examples of diol components which can be employed are ethylene glycol, diethylene glycol, neopentylglycol, hexanediol and bishydroxymethylcyclohexane.

A review of customary crosslinking agents for functional polyesters and of required additives, for example flow improvers, is given in the above literature reference. Examples of typical crosslinkers are triglycidyl isocyanurate (®Araldite PT 810), epoxy resins based on bisglycidyl-bisphenol A, or B-hydroxyalkylamides (e.g. ®Primid XL 552).

The content of crosslinking agent is usually from 2 to 20% by weight, preferably from 5 to 10% by weight, based on the polyester component, but for so-called epoxy/polyester hybrid systems can be up to 50% by weight.

Following the addition of the crosslinking agent, the temperature of the reaction mixture is lowered to a temperature which is below the softening temperature of the polyester, preferably <60° C.

In this process the polyester is obtained in powder form. The resulting spherical polyester particles are separated from the supernatant reaction solution and are purified if desired.

The polyester particles obtained by the process described are transparent and can be prepared with any desired molecular weight, for example in the range from Mn=500 to Mn=50,000. The yield is >98%. There are virtually no instances of adhesion in the reactor which would lead to a reduction in the yield.

By means of the novel process it is possible to obtain spherical polyester particles having a mean particle size (d50)<50 µm, preferably <40 µm, and in particular <30 µm, and a monomodal particle size distribution (d90–d10/d50) of ≦2.5, in particular ≦2.0 and, preferably, ≦1.5.

The resulting polyester particles are also notable for the fact that after application to an appropriate surface they can be melted at temperatures below 200° C., in particular at temperatures in the range from 120 to 200° C., preferably from 160 to 200° C., to form a continuous coating, which in the case of crosslinkable polyesters can also be cured at these temperatures.

Because of their narrow particle size distribution the spherical polymer particles according to the invention are extremely suitable for processing by the customary techniques of powder coating technology, and give rise to coatings having a very good surface.

In comparison with conventional powders, which usually give a coat thickness of from 50 to 70 µm, it is possible using the polyester powders described herein to produce coats having thicknesses <50 µm, preferably coats having thicknesses in the range from 5 to 40 µm, in particular from 10 to 35 µm.

FIGS. 1A, 1B, 1C show a comparison between the novel powders (Sample according to FIG. 1A, prepared according to Example 4m) and milled powders obtained by the prior art (Sample according to FIG. 1B), and the corresponding particle size distributions in FIG. 1C. The particle size distributions were determined by light scattering with a Malvern Mastersizer.

The examples which follow are intended to illustrate the invention:

EXAMPLE 1

Preparing an Oligomer Mixture as Starting Material For Crosslinkable Polyester 4090 g of dimethyl terephthalate (21.06 mol), 888.4 g of dimethyl isophthalate (4.58 mol), 2814 g of neopentylglycol (27.05 mol) and 1.5 g of manganese(II) acetate tetrahydrate as catalyst are weighed out into a 10 l four-necked round-bottomed flask. The flask is connected to a packed column (I=10 cm) fitted with distillation bridge. The reaction mixture is then brought to 150° C. under inert gas. At this temperature, all of the monomers are in melt form. Furthermore, at this temperature esterification begins. The temperature is controlled so that the overhead temperature does not exceed 75° C. The internal temperature is raised from 150° C. to 225° C. over the course of 4 h in order to remove from the reaction mixture as much as possible of the methanol that has formed.

6181.1 g of oligomer mixture, which solidifies at room temperature to form a transparent, vitreous mass and 1638.8 g of methanol (theoretical: 1640 g of methanol) are isolated.

EXAMPLE 2

Preparing Transparent, Crosslinkable Polyester Powders 300 g of the oligomer mixture from Example 1, 240 g of Isopar P (Exxon Chemical) and 60 g of Isopar L as heat transfer oil, 117 mg of antimony trioxide as esterification catalyst, and, as dispersion stabilizer, ®Antaron V 220 (amount see Table 1) are weighed out into a 1 l reactor with a water separator. The reaction mixture is heated under inert gas (fire risk owing to low ignition temperature of the heat transfer oils) to an internal temperature of 240° C. The distillation of heat transfer oil and neopentylglycol begins at about 230° C. (t=0 min).

Distillation is carried out for 30 minutes (stirrer speed: 2000 rpm) and then 21.88 g of trimellitic anhydride (0.114 mol) are added at the boiling temperature in order to increase the carboxyl group functionality. For a further 40 minutes the reaction mixture is held at boiling, during which a small amount of water is distilled off. Subsequently the reaction mixture is cooled with stirring.

At 180° C. the additives benzoin (1.2 g) and Byk 360 P (BYK Chemie) (4.5 g) are added. After further cooling, at 100° C. 21 g of triglycidyl isocyanurate (TGIC) are added as crosslinking agent. After the reaction mixture has been cooled to 35° C., it is filtered and the polyester powder is washed five tims with isohexane in order to remove the heat transfer medium. After drying at 30° C./0.1 mbar for three hours, 336 g of powder coating are isolated. Micrographs show the formation of spherical particles (see FIG. 1).

The dependency of the particle size on the content of dispersion stabilizer is shown in Table 1. Increasing the content of dispersion stabilizer usually leads to a reduction in the particle size.

TABLE 1

Dispersant content of the reaction mixture, particle size and span of the resulting powders, and a typical film thickness of a powder coat finish formed from the powder.

| Sample designation | Dispersant content (Antaron V 220) [%] | Particle size (d50) [μm] | Span (d90-d10/d50) | Film thickness [μm] |
| --- | --- | --- | --- | --- |
| 2a | 0.45 | 34 | 1.3 | 29 |
| 2b | 0.9 | 22 | 1.4 | 19 |
| 2c | 1.3 | 12 | 1.4 | 15 |
| 2d | 1.8 | 8 | 1.4 | 12 |

The powders obtained have a gel time at 180° C. of 2–5 minutes.

The powders were sprayed both with the aid of a triboelectric gun and with a corona gun onto aluminum panels with a thickness of 950 μm. The material was then cured at 180° C. for 20 minutes. The film thicknesses obtained are shown in Table 1.

EXAMPLE 3

Preparing an Oligomer Mixture as Starting Product For Thermoplastic Polyesters 2475 g of dimethylterephthalate (12.75 mol), 2250 g of dimethyl isophthalate (11.59 mol), 450 g of neopentylglycol (4.33 mol), 2500 g of ethylene glycol (40.28 mol), 252 g of diethylene glycol (2.37 mol) and 1.485 g of manganese(II) acetate tetrahydrate are weighed out into a 101 four-necked round-bottomed flask.

Under inert gas, the reaction mixture is heated to a temperature of 150° C. At this temperature, all of the monomers have melted. The methanol formed is distilled off via a packed column (I=10 cm) with distillation bridge. The temperature is controlled so that the overhead temperature does not exceed 75° C. The reaction mixture is heated to a temperature of 225° C. in order to remove as much as possible of the methanol from the reaction mixture.

1555 g of methanol (theoretically 1557 g) were distilled off. Cooling to room temperature gave 6240 g of highly viscous oligomeric mixture.

EXAMPLE 4

Preparing Transparent Thermoplastic Polyester Powders For Use as Powder Coatings 400 g of oligomer mixture from Example 3, Isopar P and/or Isopar L (amounts see Table 2) as heat transfer oils, and also Antaron V 220 as dispersion stabilizer (amount see Table 2) and 100 mg of antimony trioxide as transesterification catalyst are weighed out into a 1 l reactor with a water separator. The reactor is connected to the water separator. The reaction mixture is subsequently heated under inert gas to an internal temperature of 200–240° C. (see Table 2). Distillation begins at about 20° C. below the boiling point of the heat transfer medium (t=0 min). Distillation is continued for 4 h at the boiling temperature of the heat transfer oil (see Table 2). During this time, about 82 ml of the mixture of ethylene glycol, neopentyl glycol and diethylene glycol are distilled off by azeotropic distillation with the heat transfer medium. The greater part of the distillate consists of ethylene glycol.

The polyester powder is separated from the heat transfer oil by filtration. To remove adhering heat transfer oil, the polyester particles are washed three times with isohexane and then dried at 30° C./0.1 mbar for 3 h.

TABLE 2

Reaction conditions, particle size, particle size distribution for thermoplastic polyester powders, and film thickness of the transparent coatings obtained therefrom.

| Sample designation | Dispersant content [%] | Mass of heat transfer oil [g] | Ratio Isopar P/L [% by wt] | Reaction temperature [° C.] | Particle size d50 [μm] | Span | Film thickness [μm] |
| --- | --- | --- | --- | --- | --- | --- | --- |
| 4a | 1 | 488 | 50/50 | 220 | 10.8 | 2.25 | 14 |
| 4b | 0.5 | 266 | 0/100 | 200 | 19.3 | 1.42 | 23 |
| 4c | 1 | 488 | 50/50 | 220 | 13.7 | 2.1 | 17 |
| 4d | 1.5 | 933 | 80/20 | 240 | 16.6 | 2.1 | 19 |
| 4e | 1.5 | 266 | 80/20 | 240 | 12.4 | 2.4 | 15 |
| 4f | 1 | 488 | 50/50 | 220 | 14.4 | 2.16 | 17 |
| 4g | 0.5 | 933 | 80/20 | 240 | 42 | 1.39 | 51 |
| 4h | 0.5 | 933 | 0/100 | 200 | 32.1 | 1.35 | 38 |
| 4i | 0.5 | 266 | 80/20 | 240 | 29.1 | 1.84 | 35 |
| 4j | 1.5 | 266 | 0/100 | 200 | 7.62 | 1.51 | 11 |
| 4k | 1.5 | 266 | 0/100 | 200 | 7.33 | 1.8 | 10 |
| 4l | 0.5 | 266 | 80/20 | 240 | 24.5 | 1.54 | 29 |
| 4m | 0.5 | 750 | 0/100 | 200 | 14.8 | 1.14 | 16 |

The powder was applied by spraying, using a triboelectric gun and a corona gun, to iron panels with a thickness of 950 μm. To obtain a uniform surface the coating was then melted at 190° C. for five minutes. High-gloss transparent film coatings with no craters were obtained (film thicknesses see Table 2). Moreover, the fine powders could be processed without problems by the customary spray techniques for powder coatings.

EXAMPLE 5

Preparing an Epoxy-polyester Hybrid Powder Coating

In analogy to Example 2, a polyester dispersion is prepared with additives and 1% Antaron V 220. Instead of TGIC, 600 g of a 50% dispersion of the epoxide type 3003 from Shell AG in Isopar L as dispersion medium, stabilized with 1% Antaron V 220, are added at 100° C. Such a dispersion is obtained just by briefly heating a mixture of all the components to 100° C. with stirring. After 10 minutes at 100° C., the system is allowed to cool to room temperature and the powder is isolated as described in Example 2.

600 g of a powder coating having a mean particle size of 25μ, a span of 2.0 and a gel time of 4 minutes at 180° C. are obtained.

The powder gives a defect-free coating of 20μ film thickness with high gloss.

EXAMPLE 6

Preparing a Powder Coating Using ®Primid as Crosslinker

In analogy to Example 2, a polyester dispersion is prepared using 0.9% of ®Antaron V 220. Following the addition of the additives at 180° C., the mixture is cooled to 125° C. and at this temperature 16.5 g of ®Primid XL 552 are added. After cooling to room temperature, filtration and removal of residues of the heat transfer oil by washing with isohexane, a colorless powder having a mean particle size of 21 μm is isolated. The yield is >98%.

The powder is processed analogously to Example 2 to give a defect-free, transparent coating having a film thickness of 23 μm.

What is claimed is:

1. Polyester particles having a mean particle size <50 μm, which are transparent and spherical, have a monomodal particle size distribution with a span (d90–d10/d50)<2.5 and which melt at temperatures <200° C. thereby providing a continuous coating.

2. Polyester particles as claimed in claim 1, which produce coatings having a thickness <50 μm.

3. Polyester particles as claimed in claim 1, which comprise units of the formula (1) and (2)

  (1)

  (2)

where X

X is a substituted or unsubstituted $C_6$ to $C_{14}$-aromatic radical or an alkylene, polymethylene, cycloalkane or dimethylenecycloalkane group or a straight-chain or branched, saturated or unsaturated alkanediyl group and D is an alkylene, polymethylene, cycloalkane or dimethylenecycloalkane group or a straight-chain or branched, saturated or unsaturated alkanediyl group.

4. Polyester particles as claimed in claim 1, which have a molecular weight Mn in the range from 500 to 50,000.

5. A process for preparing spherical, transparent, optionally crosslinkable polyester particles by a. dispersing the starting materials for a polyester binder in the form of oligoesters which have a viscosity of less than 1000 mPas (measured at 200° C. in an inert high-boiling heat transfer medium at a temperature which is at least as high as the softening temperature of the starting materials, in the presence of at least one polymeric dispersion stabilizer, and b. then heating the reaction mixture to a temperature in the range from 120° to 280° C., with simultaneous removal of the condensation byproducts, until the polyester has the desired molecular weight;

c. thereafter cooling the reaction mixture, in the case of a crosslinkable functional polyester, to a temperature in the range from 60 to 140° C. and adding at least one polyfunctional crosslinking agent or epoxy resin, and d. subsequently reducing the temperature to within a range which is below the softening temperature of the polyester and separating off the resulting spherical polyester particles.

6. The process as claimed in claim 6, wherein the starting materials employed comprise units of the formulae (I) and (2)

  (1)

  (2)

where X

X is a substituted or unsubstituted $C_6$ to $C_{14}$-aromatic radical or an alkylene, polymethylene, cycloalkane or dimethylenecycloalkane group or a straight-chain or branched, saturated or unsaturated alkanediyl group and D is an alkylene, polymethylene, cycloalkane or dimethylenecycloalkane group or a straight-chain or branched, saturated or unsaturated alkanediyl group.

7. The process as claimed in claim 5, wherein the starting materials are heated in step (a.) to a temperature in the range from 150 to 280° C.

8. The process as claimed in claim 5, wherein the heat transfer medium used has a boiling point in the range from 150 to 300° C.

9. The process as claimed in claim 5, wherein the content of dispersion stabilizer is in the range from 0.1 to 6% by weight, based on the polyester starting materials.

10. The process as claimed in claim 5, wherein an amphiphilic copolymer is employed as dispersion stabilizer.

11. The process claimed in claim 5, wherein a polymer mixture of 1-ethenyl-2-pyrrolidon and 1-eicosen is employed as a dispersion stabilizer.

12. The process as claimed in claim 5, wherein subsequent to step (b) and after the desired molecular weight has been achieved, polyfunctional components are added to increase the functionality of the polyester.

13. The process as claimed in claim 5, wherein, following the conclusion of the condensation in step (b), the reaction mixture is cooled to 160–200° C. and additives optimize the coating properties of the polyester are added.

14. The process as claimed in claim 5, wherein the polyesters obtained have a molecular weight Mn in the range from 500 to 50,000.

15. The process as claimed in claim 5, wherein the polyester particles are obtained in powder form.

16. The process as claimed in claim 5, wherein the polyester particles obtained have a monomodal particle size distribution (d90–d10/d50) of ≦2.5.

17. The process as claimed in claim 5, wherein the polyester particles obtained produce powder coat finishes having a coating thickness <50 μm.

* * * * *

UNITED STATES PATENT AND TRADEMARK OFFICE
CERTIFICATE OF CORRECTION

PATENT NO. : 6,150,021

DATED : November 21, 2000

INVENTOR(s) : Blatter et al.

It is certified that error appears in the above-identified patent and that said Letters Patent is hereby corrected as shown below:

Claim 11, line 2, change "1-ethenyl-2-pyrrolidon" to --poly-N-vinyl-pyrrolidone--.

Signed and Sealed this

Twenty-fourth Day of April, 2001

Attest:

NICHOLAS P. GODICI

Attesting Officer

Acting Director of the United States Patent and Trademark Office